United States Patent [19]
Roth et al.

[11] Patent Number: 4,856,638
[45] Date of Patent: Aug. 15, 1989

[54] CLUTCH DAMPER WITH FRICTION LAG

[75] Inventors: William H. Roth, Centerville; Dennis C. Dull, Arcanam, both of Ohio

[73] Assignee: General Motors Corporation, Detroit, Mich.

[21] Appl. No.: 232,979

[22] Filed: Aug. 8, 1988

[51] Int. Cl.⁴ ................................................. F16D 3/14
[52] U.S. Cl. ............................. 192/106.1; 192/3.28; 192/106.2; 464/68
[58] Field of Search ............... 192/106.1, 106.2, 70.17, 192/3.28; 464/51, 68

[56] References Cited

U.S. PATENT DOCUMENTS 3,811,545  5/1974  Sato et al. ......................... 192/106.1
4,640,402  2/1987  Hartig et al. ...................... 192/106.2

FOREIGN PATENT DOCUMENTS 2042680  9/1980  United Kingdom ............. 192/106.2

Primary Examiner—Rodney H. Bonck
Assistant Examiner—David A. Testardi
Attorney, Agent, or Firm—Donald F. Scherer

[57] ABSTRACT

A clutch damper assembly has a friction lag device which is energized in only one direction of torque variance. During the occurrence of torque transients, a torque increase in the forward direction is resisted by the springs in the damper, while a torque decrease is absorbed by a friction lag device. The friction lag device is comprised of a wedge-shaped pads which are disposed in pockets on one portion of the clutch damper. The pads frictionally engage another portion of the clutch damper which is rotatable relative to the portion having the pockets. Relative motion in one direction releases the pads from frictional engagement while relative motion in the opposite direction urges frictional engagement.

3 Claims, 2 Drawing Sheets

CLUTCH DAMPER WITH FRICTION LAG

BACKGROUND OF THE INVENTION

This invention relates to clutch dampers and more particularly to clutch dampers having frictional damping in parallel with the spring damping.

Most damper mechanisms have torque transmission clutches incorporating a spring damper and a friction damper. The friction damper is active in both directions of damping; that is, during transient torque increases and transient torque decreases. The frictional damping is present to absorb a portion of the transient torque. The frictional damping also causes a hysteresis or lag when the torsional transient reverses direction. When utilizing frictional damping in both directions, only the spring rate of the damper is effective. By modifying only the spring rate, the damper can still permit some noise and vibration transmission during a torque transient.

SUMMARY OF THE INVENTION

The present invention provides friction damping and therefor hysteresis in one direction of transient torque change. During the transmission of torque from an internal combustion engine to a power transmission, transient torque spikes are experienced. One method of removing the transient torque is to utilize a torque converter. However, to improve system efficiency, torque converter clutches are currently used which effectively eliminate the damping characteristic of the torque converter from the system. Therefore, the torque converter transmissions can also experience torsional vibrations which can be experienced by the operator.

To reduce the transient torques experienced by the operator, a spring damper is incorporated with the torque converter clutch. To further reduce the possibility of vibration and noise being experienced by the operator, the present invention introduces frictional damping or frictional lag in one direction of transient torque change.

During transient torques, a torque spike occurs which generally results in a rapid increase of torque transmission followed by a rapid decrease of torque transmission. With the present invention, the rapid increase in torque transmission is damped or accommodated by spring members within the clutch damper. However, as the torque transient reverses, a plurality of friction pads are engaged between the relatively movable members of the damper such that a frictional damping occurs and the damper mechanism will following a torque vs. degrees of rotation curve substantially different from the increasing torque curve characteristic. With the friction lag generated in one direction only, a further breakup or interference with oscillations that can occur in conventional dampers will result.

It is an object of this invention to provide an improved clutch damper, wherein a friction lag mechanism is operative only during one direction of relative motion between components of the damper.

It is another object of this invention to provide an improved clutch damper having a friction lag mechanism including a plurality of wedge-shaped pads disposed in wedge-shaped pockets, wherein the pads frictionally engage a member rotatable relative to the pocket member such that relative rotation of the engaged member in the direction of the converging wedge causes increased frictional engagement of the pads.

It is yet another object of this invention to provide an improved torsional vibration damper for a selectively engageable clutch, wherein a plurality of spring members and friction pad members are disposed in parallel within the damper assembly, and wherein the friction pads are maintained between relatively movable components of the damper, and further wherein one of the movable components has ramps disposed thereon which cooperate with the friction pads to urge the friction pads into frictional engagement with the other relatively movable member when the relative motion is in one direction and to release the friction pads when the relatively motion is in the other direction.

These and other objects and advantages of the present invention will be more apparent from the following description and drawings.

DESCRIPTION OF THE PREFERRED EMBODIMENT

Figure 1:
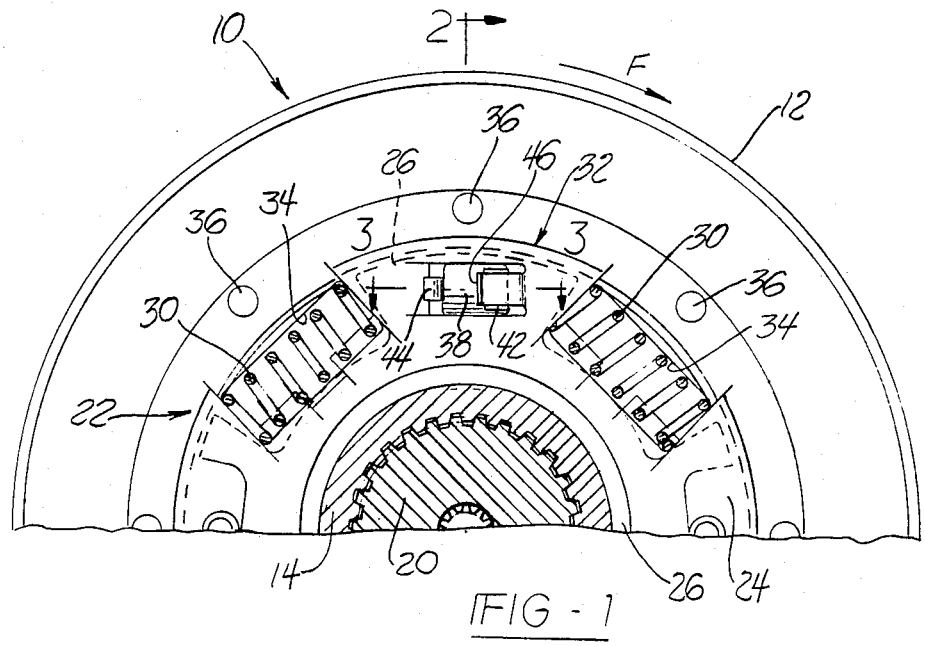
FIG. 1 is a partial elevational view of a damper present invention.
Figure 2:
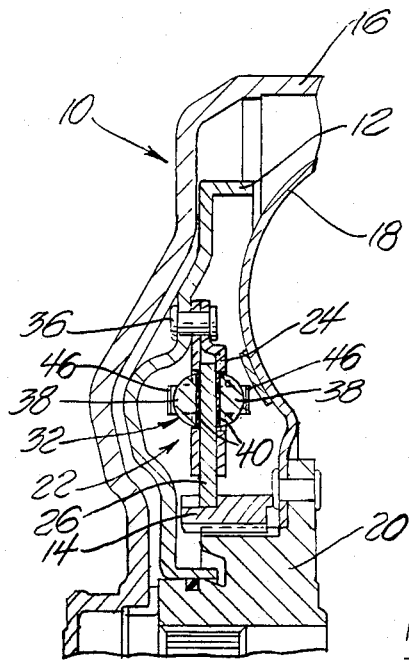
FIG. 2 is a sectional view taken along line 2—2 of FIG. 1.

Referring to the drawings, wherein like characters represent the same or corresponding parts throughout the several views, there is seen particularly in FIGS. 1 and 2, a clutch and damper assembly generally designated 10, which includes a clutch plate member 12 and a driven or output clutch hub member 14.

The clutch assembly 10 is disposed within a torque converter which is partially shown in the drawings and includes an input shell 16 and a turbine member 18. The torque converter assembly is a well-known conventional device which is generally driven by an engine and delivers power to a planetary gear transmission. These devices are well known and the present invention can be used with many of these conventional apparatuses.

The input shell 16 is drivingly connected with a conventional torque converter input or impeller, not shown, which through a fluid drive arrangement drives the torque converter turbine 18. The torque converter turbine has an output or driven hub 20 which is drivingly connected to the driven hub 14 of the clutch assembly 10.

Disposed between the drive member 12 and driven member 14 of the clutch assembly 10 is a damper assembly, generally designated 22, which includes an input housing portion 24, a driven plate 26, a plurality of spring members 30 and a plurality of friction damper assemblies, generally designated 32.

The springs 30 are disposed in spring pockets 34 formed between the input housing 24 and the driven plate 26. The driven plate 26 in turn is splined to the clutch output hub 14. The input housing 24 is secured to the drive member 12 by a plurality of fasteners such as rivets 36. As is well known with clutch damper assemblies, the springs 30 will permit relative angular displacement or rotation between the input housing 24 and the driven member 26 when a sudden torque change is occasioned by the engaged clutch.

Figure 4:
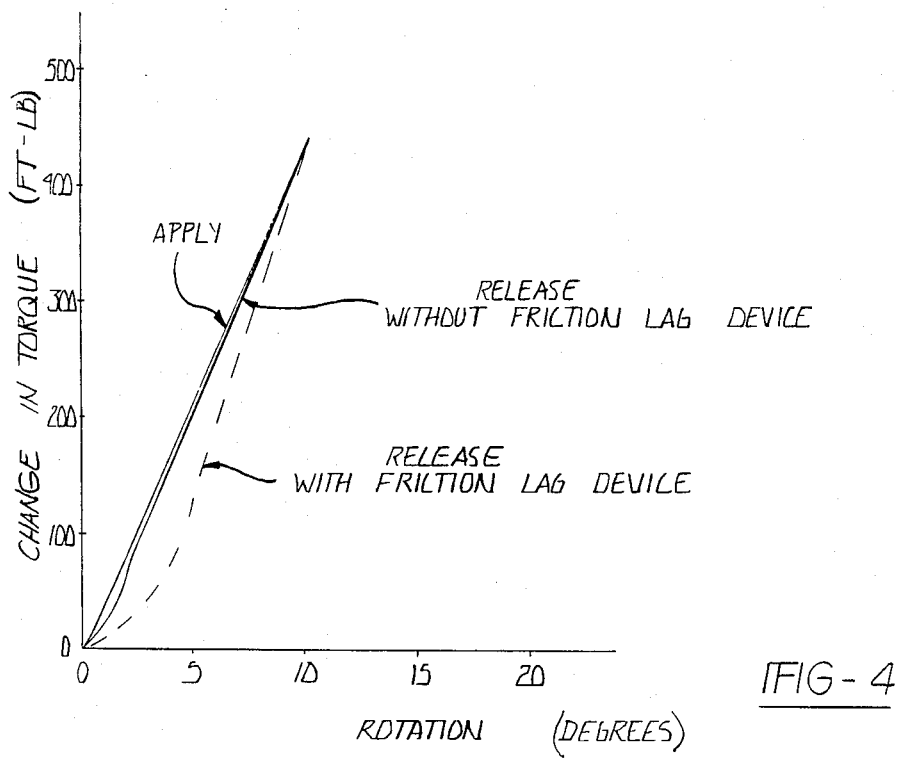
FIG. 4 is a curve depicting the characteristics between torque transmission and degrees of relative rotation within the damper mechanism.

A typical characteristic curve exhibited by a spring damper is shown in FIG. 4 and labeled "Apply". This simplified curve shows the degrees of rotation vs. the value of torque transmitted with a typical spring damper. For example, 10 degrees of relative rotation will occur between the input and output members of a clutch damper when 400 foot pounds of torque is transmitted. When this torque increase or change occurs as a transient, the torque will subside almost as rapidly as it occurred. The spring damper permits the relatively movable components to accommodate these rapid torque changes. If the damper does not incorporate any friction lag, the decreasing or release of transient torque will follow substantially the same curve as the application of the torque transient.

In conventional devices utilizing friction lag in both directions, the torque characteristic will exhibit a substantially horizontal or constant torque portion in the torque vs. rotation curve at the maximum transmission value and a release curve parallel to the apply curve. This represents the well known hysteresis which occurs in conventional friction dampers. However, because the application and release curves are parallel, it is possible to encounter transient torque conditions which will result in noise and possible vibration which can be experienced by the operator.

With the present invention, the friction damper assemblies 32 alleviate this condition and result in a release curve shown as a dashed line in FIG. 4 and labeled "Release with Friction Lag Device". It will be noted that the release curve with the present invention is not parallel to the apply curve and therefore any torque transient which might generate noise or vibration in a spring system represented by the apply curve will not generate the same undesirable effect during the release cycle. Accordingly, a wider range of torque transients can be accommodated without the operator experiencing noise and vibration.

Figure 3:
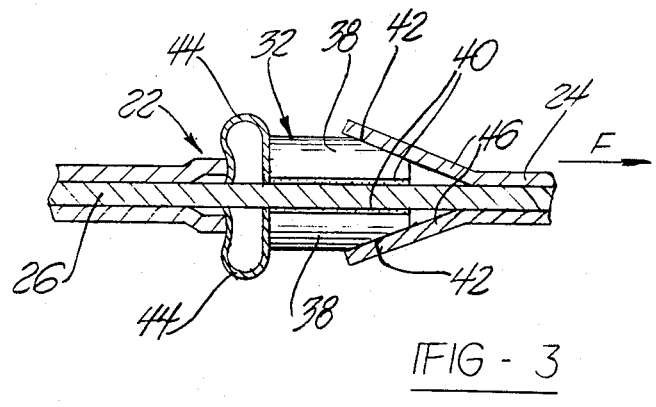
FIG. 3 is a sectional view taken along line 3—3 of FIG. 1.

As particularly seen in FIG. 3, each friction damper assembly 32 is comprised of a pair of friction pads 38 each of which is a generally semicylindrical member having a friction surface 40 and a wedge-shaped surface 42. Each assembly also incorporates a retainer spring mechanism 44 which is compressed between the input housing 24 and the friction pads 38. The housing 24 has formed therein a wedge-shaped pocket or ramps 46 for each friction damper assembly 22. The wedge-shaped pocket 46 conforms to the wedge-shaped surface 42 on the pads 38. The springs 44 urge the friction pads 38 into the pockets 46. Due to the wedge-shape, the friction pads are then urged into friction engagement with the driven plate 26.

During a transient torque increase, the drive member 12 and therefore housing 24 will rotate relative to the driven plate 26 in the direction of Arrow F. When this occurs, as best seen in FIG. 3, the pockets 46 will have a tendency to separate from the wedge-shaped surface 42 thus reducing the frictional engagement with the driven plate 26. Therefore, during a transient torque increase, substantially no frictional damping occurs from the pads 38.

During a decrease in torque transient or torsional spike in the opposite direction, the relative motion between the housing 24 and plate 26 is opposite to Arrow F. During this relative motion, the wedge-shaped pockets 46 will urge the friction pads 38 into frictional engagement with the driven plate 26 causing a frictional lag or damping friction between the input and output portions of the damper. The retainer springs 44 will permit some resilience between the pads 38 and the input housing 24 during the damping function while ensuring the pads 38 remain in contact with the pockets 46. These retainer springs 44 also ensure that the friction pads 38 will be maintained in the proper position within the pockets 46.

By utilizing the one-way friction damping, the spring characteristics of the system will substantially change during transient torque increase relative to the transient torque decrease. As is well known in spring systems, if this characteristic changes, the natural frequency or the modes under which vibration and noise are transmitted also are changed significantly. Therefore, there is little likelihood of noise being generated within the operating range of the clutch damper when utilizing the present invention.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follow:

1. A clutch damper having a friction lag device, said damper being subjected to forward and reverse transient torque impulses from a drive source; said damper comprising: a drive member selectively engageable with the drive source; a driven member connected for continuous drive to an output member; spring means disposed between said drive member and said driven member for transmitting drive torque therebetween and for permitting relative angular motion when abrupt changes in drive torque occur; and friction lag means for providing a hysteresis in the relative angular motion in the reverse torque direction comprising a wedge-shaped pocket on one of said drive and driven members, a wedge-shaped pad freely disposed in said pocket and urged into said pocket by a retainer spring means, and friction surface means on said pad, the other of said drive and driven members having a surface adjacent said friction surface means, said pad being movable away from said pocket due to friction between said surface and said friction surface means during forwardly directed transient torque impulses to reduce a friction load on said other members and said pad being forced into said pocket during reversely directed transient torque impulses, the wedge-shapes performing as cam members to increase the friction load on said other member and provide the hysteresis in the relative angular motion.

2. A clutch damper having a friction lag device, said damper being subjected to increasing and decreasing transient torque impulses from a drive source; said damper comprising: a drive member selectively engageable with the drive source; a driven member connected for continuous drive to an output member; spring means disposed between said drive member and said driven member for transmitting drive torque therebetween and for permitting relative angular motion when increases and decreases in the drive torque occur; and friction damping means for providing a hysteresis in the relative angular motion in the decreasing torque direction comprising ramp means on one of said drive and driven members, a friction pad having a wedge-shaped portion freely disposed adjacent said ramp means and urged against said ramp means by retainer spring means, and friction surface means on said pad, the other of said drive and driven members having a surface adjacent said friction surface means, said pad being urged away from said ramp means due to friction between said surface and said friction surface means during increasing transient torque impulses to reduce a friction load on said other member and said pad being forced into said ramp means during decreasing transient torque impulses, said wedge-shaped portion performing as a cam member to increase the friction load on said other member to provide the hysteresis in the relative angular motion.

3. A clutch damper having a friction lag device, said damper being subjected to forward and reverse transient torque impulses from a drive source; said damper comprising: a drive member selectively engageable with the drive source; a driven member connected for continuous drive to an output member; spring means disposed between said drive member and said driven member for transmitting drive torque therebetween and for permitting relative angular motion when abrupt changes in drive torque occur; and friction lag means for providing a hysteresis in the relative angular motion in the reverse torque direction comprising a plurality of ramp members on one of said drive and driven members, a semicylindrical friction pad having a wedge-shaped portion freely disposed adjacent each of said ramp members and being urged into abutment with said ramp members by retainer spring means, and friction surface means on each said friction pad, the other of said drive and driven members having a surface disposed adjacent each said friction surface means for cooperating in frictional engagement therewith, each said pad being movable away from said ramp members during transient torque impulses in one direction of relative motion to reduce a friction load on said other member and each said pad being urged into abutment with said ramp members during transient torque impulses in another direction of relative motion, said wedge-shape portions performing as cam members to increase the friction load on said other member to provide the hysteresis in the relative angular motion.

* * * * *